US007984335B2

(12) United States Patent
Adya et al.

(10) Patent No.: US 7,984,335 B2
(45) Date of Patent: Jul. 19, 2011

(54) TEST AMPLIFICATION FOR DATACENTER APPLICATIONS VIA MODEL CHECKING

(75) Inventors: Atul Adya, Redmond, WA (US);
Alastair Wolman, Seattle, WA (US);
John Dunagan, Bellevue, WA (US);
David Andrew Schultz, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 396 days.

(21) Appl. No.: 12/052,655

(22) Filed: Mar. 20, 2008

(65) Prior Publication Data
US 2009/0240987 A1 Sep. 24, 2009

(51) Int. Cl.
G06F 11/00 (2006.01)
(52) U.S. Cl. ..................... 714/38.1; 717/124
(58) Field of Classification Search ............ 714/38, 714/38.1; 717/124
See application file for complete search history.

(56) References Cited

U.S. PATENT DOCUMENTS

| | | | | |
|---|---|---|---|---|
| 5,815,654 | A * | 9/1998 | Bieda | 714/38 |
| 6,385,741 | B1 * | 5/2002 | Nakamura | 714/38 |
| 6,928,393 | B2 * | 8/2005 | Czerwonka | 702/186 |
| 6,931,629 | B1 * | 8/2005 | Yount et al. | 717/126 |
| 6,993,682 | B2 | 1/2006 | Corrie | |
| 7,020,797 | B2 * | 3/2006 | Patil | 714/4 |
| 7,055,065 | B2 * | 5/2006 | Farchi et al. | 714/38 |
| 7,167,870 | B2 * | 1/2007 | Avvari et al. | 1/1 |
| 7,185,231 | B2 * | 2/2007 | Mullally et al. | 714/38 |
| 7,216,338 | B2 * | 5/2007 | Barnett et al. | 717/126 |
| 7,272,752 | B2 * | 9/2007 | Farchi et al. | 714/38 |
| 7,281,185 | B2 | 10/2007 | Maoz et al. | |
| 2003/0046029 | A1 | 3/2003 | Wiener et al. | |
| 2003/0208351 | A1 * | 11/2003 | Hartman et al. | 703/22 |
| 2005/0229044 | A1 * | 10/2005 | Ball | 714/38 |
| 2005/0278577 | A1 * | 12/2005 | Doong et al. | 714/38 |
| 2006/0129891 | A1 | 6/2006 | Padisetty et al. | |
| 2006/0248519 | A1 | 11/2006 | Jaeger et al. | |
| 2007/0005281 | A1 | 1/2007 | Haggerty | |
| 2007/0033440 | A1 * | 2/2007 | Tillmann et al. | 714/38 |
| 2007/0220341 | A1 | 9/2007 | Apostoloiu et al. | |
| 2007/0240116 | A1 | 10/2007 | Bangel et al. | |
| 2007/0250799 | A1 | 10/2007 | Bunin et al. | |

(Continued)

OTHER PUBLICATIONS

Dick Hamlet, et al. Faults on Its Sleeve: Amplifying Software Reliability Testing. ACM-L5STA'93-6/93 /Cambridge, MA, USA. 1993 ACM 0-89791 -608 -5/93 /0006 /0089 http://web.nps.navy.mil/~nschneid/sw4581/hamlet%20and%20voas.pdf. Last accessed Nov. 7, 2007, 10 pages.

(Continued)

Primary Examiner — Yolanda L Wilson
(74) Attorney, Agent, or Firm — Turocy & Watson, LLP

(57) ABSTRACT

Systems and methods are provided to determine execution errors in distributed computing environments. In an illustrative implementation, a computing environment comprises a test amplification engine and at least one instruction set to instruct the test amplification engine to process data representative of a request to perform a test for one or more execution errors in an distributed computing environment according to a selected execution error testing paradigm dependent on identifying critical sources of non-determinism for execution within the exemplary distributed computing environment. In an illustrative operation, a participating distributed computing environment operator (e.g., programmer) can cooperate with the test amplification engine to select an existing unit or integration test, instrument sources of non-determinism and to select one or more instrumentations for the unit or integration test for execution in the exemplary distributed computing environment to elicit the occurrence of one or more execution errors.

20 Claims, 8 Drawing Sheets

U.S. PATENT DOCUMENTS

2008/0282124 A1* 11/2008 Esposito et al. .............. 714/736

OTHER PUBLICATIONS

Pallavi Joshi, et al. Predictive Testing: Amplifying the Effectiveness of Software Testing. Technical Report No. UCB/EECS-2007-35, Mar. 20, 2007. http://www.eecs.berkeley.edu/Pubs/TechRpts/2007/EECS-2007-35.pdf. Last accessed Nov. 7, 2007, 12 pages.

Yuewei Zhou, et al. Towards a Practical Approach to Test Aspect-OrientedSoftware http://66.102.1.104/scholar?hl=en&Ir=&q=cache:3vOVmZq_urYJ:www.isr.uci.edu/~yueweiz/research/Yuewei_finalversion_TECOS04.pdf+%22+Towards+a+practical+approach+to+test+aspect-oriented+software+%22. Last accessed Nov. 7, 2007, 1 page.

* cited by examiner

TEST AMPLIFICATION FOR DATACENTER APPLICATIONS VIA MODEL CHECKING

BACKGROUND

The deployment of an application, protocol, or other executable in a distributed computing environment can result in various execution errors which affect the operation of the application, protocol, or other executable and can impact the operation of the distributed computing environment itself. Although computing application developers/programmers attempt to identify and resolve execution errors in the application, protocol, or other executable prior to deploying the application in the distributed computing environment, often execution errors will only appear after deployment (i.e., not in a development and/or test environment). The ability to identify such execution errors after deployment has been addressed with a number of currently deployed practices.

However, finding computing environment execution errors (e.g., bugs) in distributed computing environments is a notoriously hard problem. Conventionally, developers will deploy one or more computing application scripts and/or applets that when executed operate to exercise computing environments in desired manners (e.g., particular ways) that have a high probability of eliciting bugs. However, given the numerous and different orders in which events can occur and the number of ways in which components can fail, manual testing achieving moderate completeness is rendered an extremely arduous, time-consuming, and costly task.

Current practices do not allow for the execution of error execution identification tests utilizing highly relevant sources of non-determinism as identified by the distributed computing environment operator (e.g., programmer of the distributed computing application, protocol, or other executable in a distributed computing environment). Additionally, current practices do not consider providing more than one execution path using test code and/or application code instrumentation for an execution error test to identify additional possible sources for error executions. As such, with currently deployed practices, the tests for execution errors can run repeatedly over a prolonged duration without eliciting previously observed but non-frequent execution errors. This can result in the need for additional computational and, more importantly, manual resources to identify execution errors.

From the foregoing it is appreciated that there exists a need for systems and methods to ameliorate the shortcomings of existing practices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The subject matter described herein allows for systems and methods to determine execution errors in distributed computing environments. In an illustrative implementation, a computing environment comprises a test amplification engine and at least one instruction set to instruct the test amplification engine to process data representative of a request to perform a test for one or more execution errors in an distributed computing environment according to a selected execution error testing paradigm dependent on identifying critical sources of non-determinism for execution within the exemplary distributed computing environment.

In an illustrative operation, a participating distributed computing environment operator (e.g., programmer) can cooperate with the test amplification engine to select an existing unit or integration test, instrument sources of non-determinism and to select one or more instrumentations for the unit or integration test for execution in the exemplary distributed computing environment to elicit the occurrence of one or more execution errors. In the illustrative operation, the test amplification engine executes the selected test repeatedly. Illustratively, when the test reaches a source of non-determinism that has been instrumented, the test amplification engine operatively selects one of the set of possible outcomes at the instrumentation point for continued execution by the distributed computing environment.

Illustratively, during the execution of the test when the test completes or throws an exception, the test amplification engine can illustratively operate to rerun the test, making a different set of choices and returning the results of the test routine.

In an illustrative implementation, the exemplary test amplification engine allows for application specific instrumentation in a distributed computing environment and allows for the identification of execution errors.

The following description and the annexed drawings set forth in detail certain illustrative aspects of the subject matter. These aspects are indicative, however, of but a few of the various ways in which the subject matter can be employed and the claimed subject matter is intended to include all such aspects and their equivalents.

DETAILED DESCRIPTION

Figure 1:
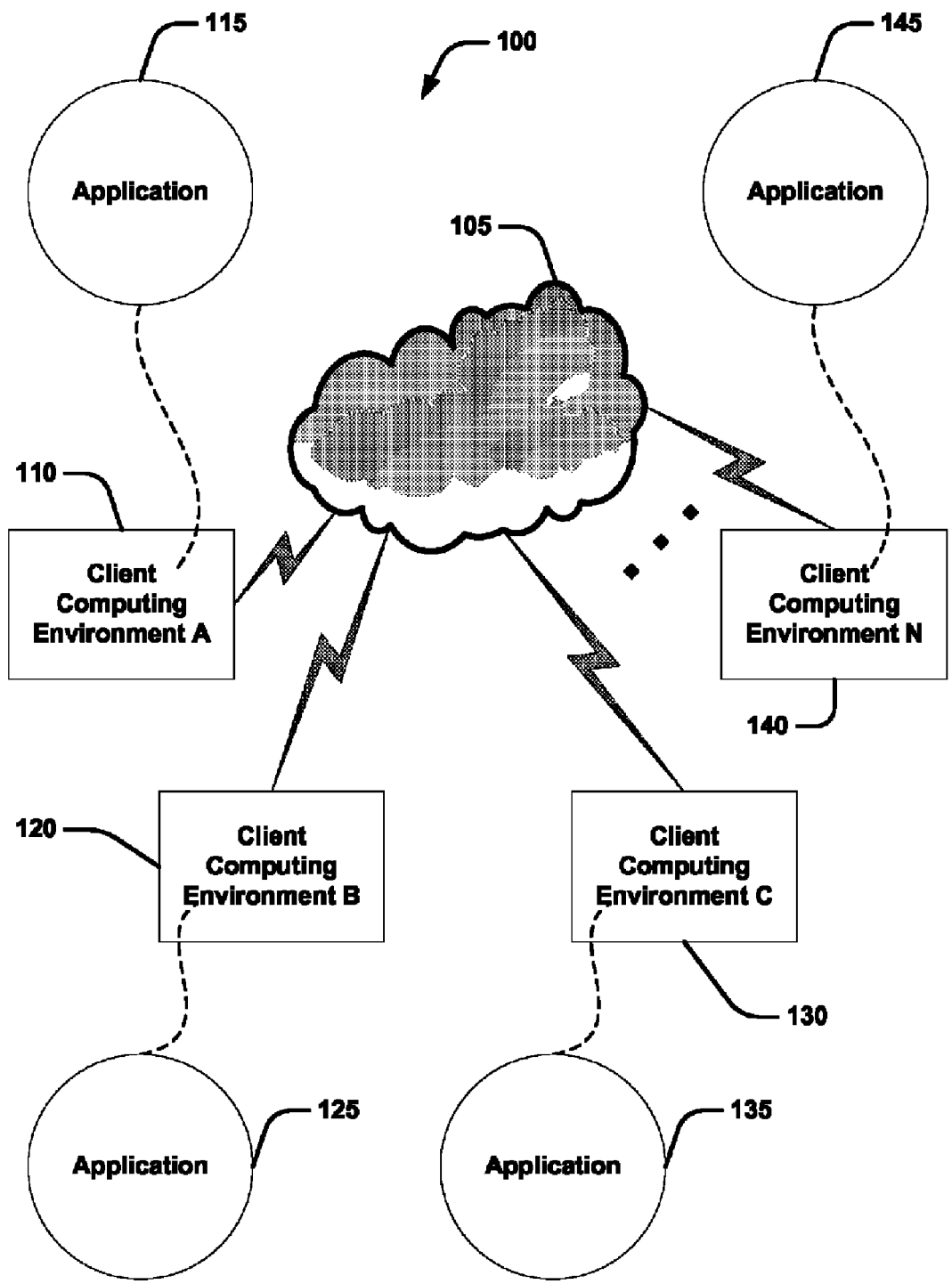
FIG. 1 is a block diagram of one example of a distributed computing environment in accordance with the herein described systems and methods.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative illustrations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

Test Amplification Overview:

In an illustrative implementation, points in an exemplary computing program where execution paths may diverge based on external influences such as network delay, component failures, and scheduling can be considered sources of non-determinism.

To ameliorate the shortcomings of existing practices, the herein described systems and methods provide a model checking tool that can be operative to automatically drive existing execution error tests to explore the computing application state space utilizing minimal test code instrumentation and/or application code instrumentation. In an illustrative operation, a participating user can deploy an existing unit or integration test, and instruments (e.g., interposes on) sources of non-determinism that can elicit execution errors. Examples of important sources of non-determinism, (i.e. for a given application) can include but are not limited to message delivery over the network and the firing of timers. An example of an unimportant source of non-determinism (i.e., for a given application) is the nonce chosen in an SSL handshake response.

In the illustrative implementation, the participating user can invoke an exemplary test amplification engine, illustratively passing it the entry point to the test routine. In an illustrative operation, the test amplification engine can execute the test routine repeatedly. Illustratively, when a source of non-determinism that has been instrumented (e.g., by setting an interposition point) by a programmer is reached, the exemplary test amplification engine can operate to choose one out of the set of possible outcomes at that point. When the test routine completes or throws an exception, the exemplary test amplification engine can illustratively operatively rerun the test, making a different set of choices. It is appreciated that, illustratively, when the test routine throws an exception, the test amplification engine can operatively save the history of the choices made at instrumented points of non-determinism which can enable the programmer to reproduce the execution error.

FIG. 1 describes an exemplary computing environment 100 that can support current practices in identifying and rectifying execution errors. As is shown, exemplary computing environment comprises communications network 105 operatively coupled to a plurality of client computing environments comprising client computing environment A 110, client computing environment B 125, client computing environment C 130, up to an including client computing environment N 140. Additionally, as is shown in FIG. 1, the plurality of the client computing environments can operate one or more computing applications such that client computing environment A 110 can operate application 115, client computing environment B 120 can operate application 125, client computing environment C 130 can operate application 135, up to an including client computing environment N 140 operating application 145.

In an illustrative operation, the plurality of client computing applications can electronically communicate data between each other by employing communications network 105. In the illustrative implementation, one or more of the computing applications operative on the plurality of the client computing environments can provide one or more facilities (not shown) to allow for the execution error tests to identify execution errors across one or more of the plurality of client computing environments (e.g., distributed computing environment). Such application can deploy currently available practices used to address execution error testing and later create remedies.

Figure 2:
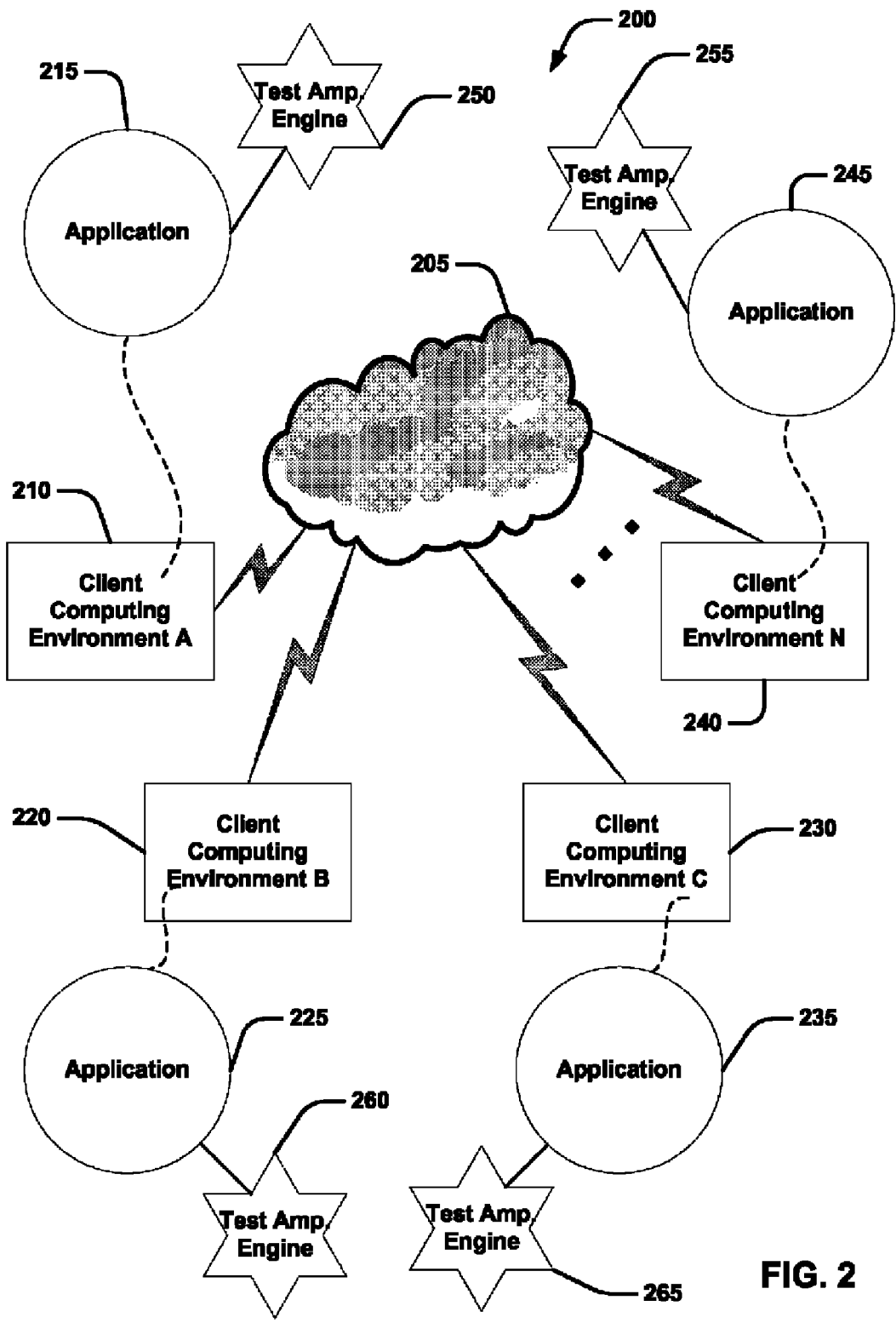
FIG. 2 is a block diagram of one example of a distributed computing environment deploying test amplification in accordance with the herein described systems and methods.

FIG. 2 describes exemplary computing environment 200 operative to provide execution error testing facilities utilizing test amplification operations. As is shown, exemplary computing environment 200 comprises communications network 205 operatively coupled to a plurality of client computing environments comprising client computing environment A 210, client computing environment B 225, client computing environment C 230, up to an including client computing environment N 240. Additionally, as is shown in FIG. 2, the plurality of the client computing environments can operate one or more computing applications such that client computing environment A 210 can operate application 215, client computing environment B 220 can operate application 225, client computing environment C 230 can operate application 235, up to an including client computing environment N 240 operating application 245. Additionally, as is shown in FIG. 2 the plurality of applications operating on the plurality of client computing environments can further comprise an exemplary test amplification engine, such that application 215 can operate test amplification engine 250, application 225 can operate test amplification engine 260, application 245 can operate test amplification engine 255, and application 235 can operate test amplification engine 265. It is appreciated that although each exemplary application is described to operate a test amplification engine that such description is merely illustrative as the herein described systems and methods allow for the use of a single test amplification engine operable on a plurality of applications.

It is appreciated that although exemplary computing environment 200 is shown to have one or more computing applications 225, 235, and 240 comprising exemplary test amplification engines 225, 235, and 265 that such description is merely illustrative as the herein described systems and methods can be deployed in an exemplary computing environment having one or more computing applications each of which is operative to deploy the same test amplification engine.

In an illustrative operation, the plurality of client computing applications can electronically communicate data between each other by employing communications network 205. In the illustrative implementation, one or more of the computing applications operative on the plurality of the client computing environments can provide one or more facilities (not shown) to allow participating programmers (e.g., participating users) (not shown) to invoke one or more execution error tests to identify execution errors across one or more of the plurality of client computing environments (e.g., distributed computing environment). In the illustrative operation, a participating user (e.g., programmer) can interface with one of the plurality of applications 215, 225, 235, and/or 245 to provide an input representative of a selected execution error test to be executed on one or more of the plurality of the client computing environments (e.g., an exemplary distributed computing environment). In the illustrative operation, a corresponding test amplification engine (e.g., 250, 255, 260, and 265) can receive the inputs and process them to execute the selected execution error test according to a test execution paradigm such that the test execution paradigm can require the participating user to instrument one or more application calls and/or points of non-determinism to monitor when an execution error test for a given computing application reaches a source of non-determinism.

Figure 3:
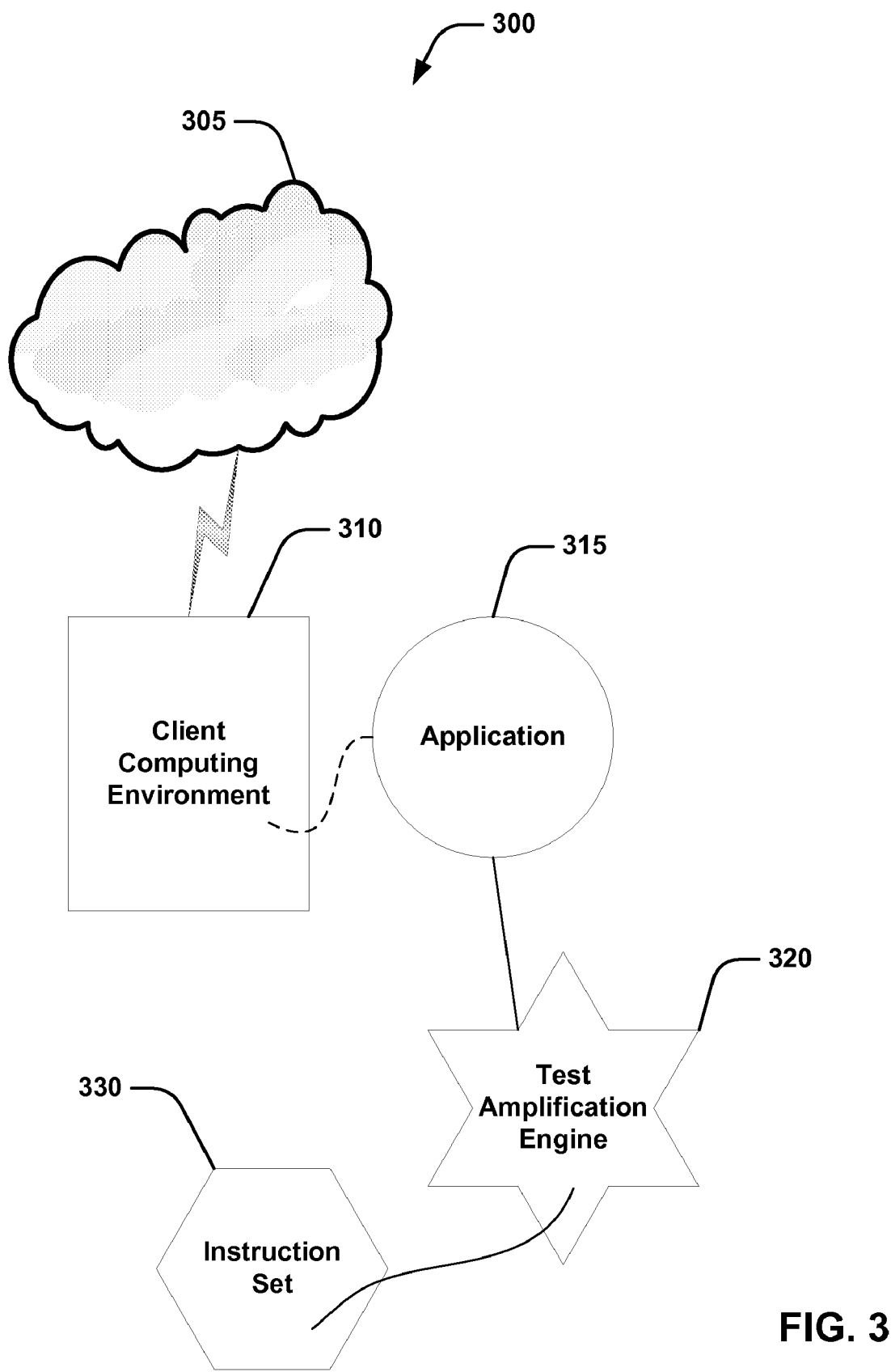
FIG. 3 is a block diagram of the interaction of exemplary components of a test amplification environment in accordance with the herein described systems and methods.

FIG. 3 schematically illustrates exemplary computing environment 300 deploying an execution error test paradigm deploying test amplification operations. As is shown in FIG. 3, exemplary computing environment 300 comprises communications network 305 operatively coupled to client computing environment 310 (and other cooperating computing environments—not shown) which operates application 315 that executes test amplification engine 320. Further, as is shown, test amplification engine cooperates with instruction set 330. Instruction set 330 implements the additional logic for how to behave when the test reaches a source of non-determinism.

In an illustrative operation, a participating user (not shown) can provide input to application 315 representative of an execution error test request. Responsive to the request, the test amplification engine 320 can process the execution error test request according to one or more instructions provided by instruction set 330. Illustratively, the instruction set can comprise one or more instructions representative of a test execution paradigm that can require the participating user to instrument one or more portions of a selected execution test such that the test can execute until a point where a source of non-determinism is identified.

Figure 4:
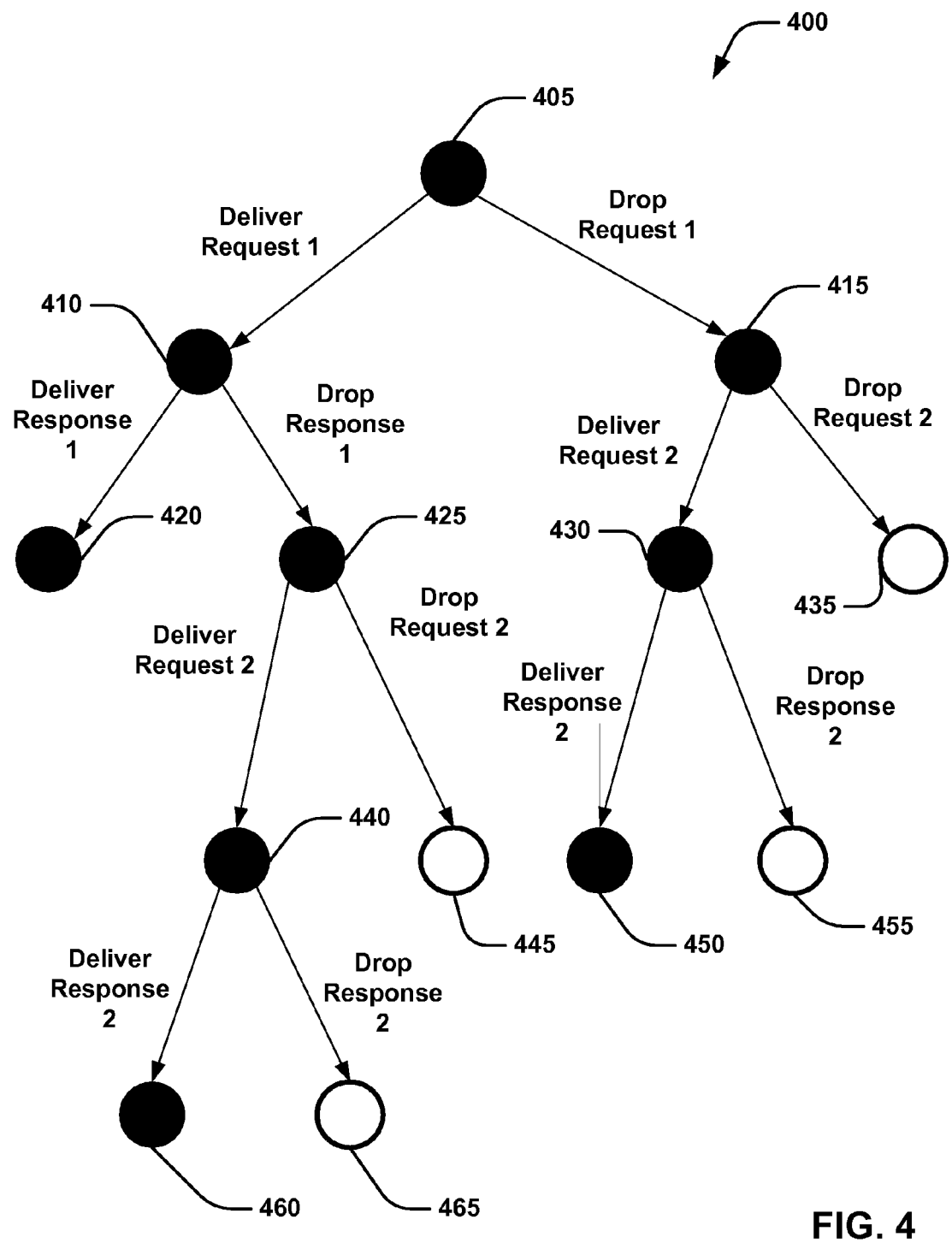
FIG. 4 is a block diagram of the schematic of a decision tree representative of an integration test in accordance with the herein described systems and methods.

FIG. 4 schematically illustrates exemplary decision tree 400 that can be employed by an exemplary test amplification engine when running a test for execution errors. By way of example, a client/server application, for example, can be implemented on top of an unreliable transport protocol. Illustratively, the computing environment (not shown) can comprise a client that sends a request, waits a selected period of time, sends another request if the client hasn't received a response, waits another selected period of time, then reports failure if it still doesn't get a response after both attempts. The server component simply sends a response each time it receives a request.

In the example provided, this application can be run over an unreliable, asynchronous network. In this example, messages can get delivered within a maximum delay of a selected period of time, or the network may be unable to deliver the messages. Also, in this example, the network could drop the first request, and/or the response to the first request, and/or the second request, and/or the response to the second request. The possible executions of this exemplary system with one client and one server can be represented by exemplary decision tree 400 of FIG. 4. As is shown, decision tree 400 comprises a first decision entry point 405 where a first decision is performed. If the first request is be delivered the decision tree moves to decision node 410. Alternatively, if the first request is to be dropped, the decision tree proceeds to decision node 415. From decision node 410 a decision needs to be made to deliver the first response at decision node 420 where the decision tree terminates or to drop the first response at decision node 425. However, if the first request is dropped, the decision tree proceeds from decision node 415 to decision node 430 where a second request is delivered where a new decision is to be made whether to deliver a second response. If the second response is to be dropped at decision 430 node, the decision tree proceeds to decision node 455 (described by an unfilled circle to denote an instance where the exemplary client fails to receive a reply from an exemplary cooperating server and calls an error). Also, if the decision to drop the second request is made at decision node 415, the decision tree proceeds to decision node 435 and the decision tree terminates.

From decision node 425, a new decision is made whether to deliver the second request. If the second request is to be delivered, the decision tree proceeds to decision node 440. However, if the decision is to drop the second request at decision node 425, the decision tree proceeds to decision node 445 where processing terminates. From decision node 440, the decision tree proceeds to decision node 460 where the second response is delivered.

In an illustrative implementation, the exemplary system can operate to execute a directed path through this tree from the root to a leaf.

With reference to FIGS. 1-4, in an exemplary implementation, at an instrumented source of non-determinism, the set of choices made by previous executions of the selected test routine can be recorded by the exemplary test amplification engine so that when the current execution of selected test routine reaches a given point of non-determinism, the test amplification engine can make a different choice than previous executions, thereby exploring a different branch of the decision tree.

In another illustrative implementation, an exemplary test amplification engine can operatively fork the state of the computation of a selected test routine whenever it reaches a source of non-determinism, which implies a branch in the tree (as described by decision tree 400 of FIG. 4 for the stated client/server example). In one execution instance of the decision tree execution, the exemplary test amplification engine could explore one branch, and in another execution instance, the exemplary test amplification engine could explore a different branch. The exemplary test amplification engine can also perform a replay of one execution of the exemplary decision tree. Additionally, the exemplary test amplification engine can illustratively operate to explore one path in the decision tree fully, then can operate to restart the test from the beginning to explore another path that potentially overlaps the original one.

In an illustrative operation, the exemplary test amplification engine can operate in various exploration modes comprising: 1) Explore Exhaustively—attempts to explore the entire tree, starting at a random path and continuing in a linear fashion; 2) Explore Exhaustively To Depth—explores exhaustively to a bounded depth in the tree, and can perform a single random probe from each leaf at a bounded depth after that; and 3) Explore Randomly—does a specified number of iterations of the test, where the exemplary test amplification engine avoids exercising the available non-determinism in a systematic way.

In the client/server example provided herein, in an illustrative implementation, partial instrumentation can be deployed to identify execution errors. In the illustrative implementation, the exemplary test amplification engine can operate to detect when the tree branched due to factors outside of the test amplification engine's control and can operatively explore the instance when that happens. In the considered example, if the server-to-client connection was not instrumented by the programmer such that the exemplary test amplification engine illustratively operates to monitor the state of the test and in the instance it detects a failure while attempting to explore exhaustively, it can operatively fork the state of the tree, creating an alternate state for a current sub-tree. Further, the exemplary test amplification engine can continue the exploration in the alternate state, and in subsequent iterations, the exemplary test amplification can decide which state to deploy.

Figure 5:
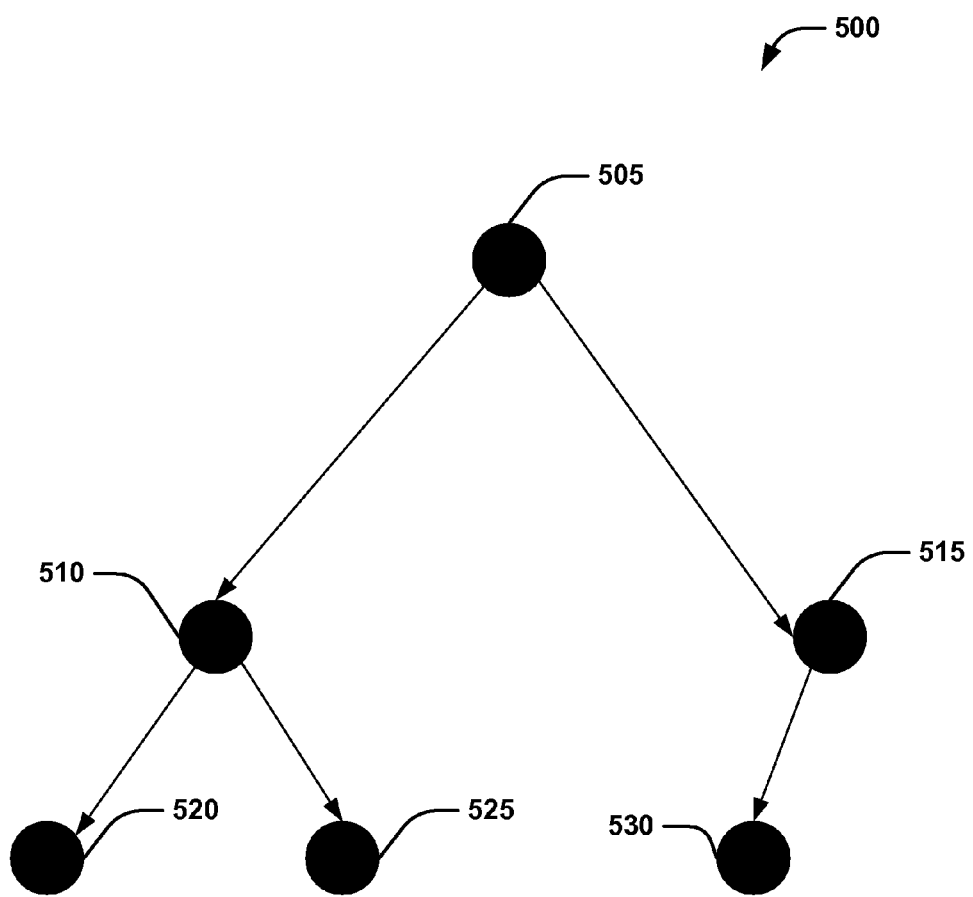
FIG. 5 is a block diagram of another schematic of a decision tree representative of an integration test in accordance with the herein described systems and methods.

FIG. 5 shows another decision tree 500 where an exemplary test amplification engine can operatively execute a test for a computer program where some sources of non-determinism are instrumented. As is shown in FIG. 5 decision tree comprises root decision node 505 where a first decision is made to proceed to decision nodes 510 or 515. From decision node 510, a second decision is made to proceed to decision node 520 or 525. Also, as is shown, the decision tree can proceed to a new decision node 530 from decision node 515.

In an illustrative operation, an exemplary test amplification engine can explore executions performed at decision node 520 of FIG. 5 and decision node 525 of FIG. 5, the exemplary test amplification engine processes decision node 510 of FIG. 5 twice. Illustratively, it would take a snapshot of the process at decision 510, explore decision node 520, restore the snapshot, then explore decision node 525.

In an illustrative operation, the exemplary test amplification engine can operate to explore decision node 520, then can restart the test from the beginning and can attempt to deterministically replay the program execution to decision node 510, where the exemplary test amplification engine can then choose the branch that leads to decision node 525. In the event that the control flow diverges due to factors that are not within the test amplification engine's control, the test amplification engine may wind up at point decision node 515 when it intended to arrive at decision node 510.

In the illustrative operation, to resolve this difficulty, the exemplary test amplification engine can interpose a superimposed decision node on top of the existing decision nodes as found in exemplary decision tree 500. Illustratively, the superimposed nodes detect when the action that the exemplary test amplification engine was asked to perform on a previous execution of the program is inconsistent with the action being requested on the current execution. In this instance, the exemplary test amplification engine can operate to fork the tree at that point, and on subsequent executions requests get mapped transparently into the correct sub-tree based on the arguments.

Figure 6:
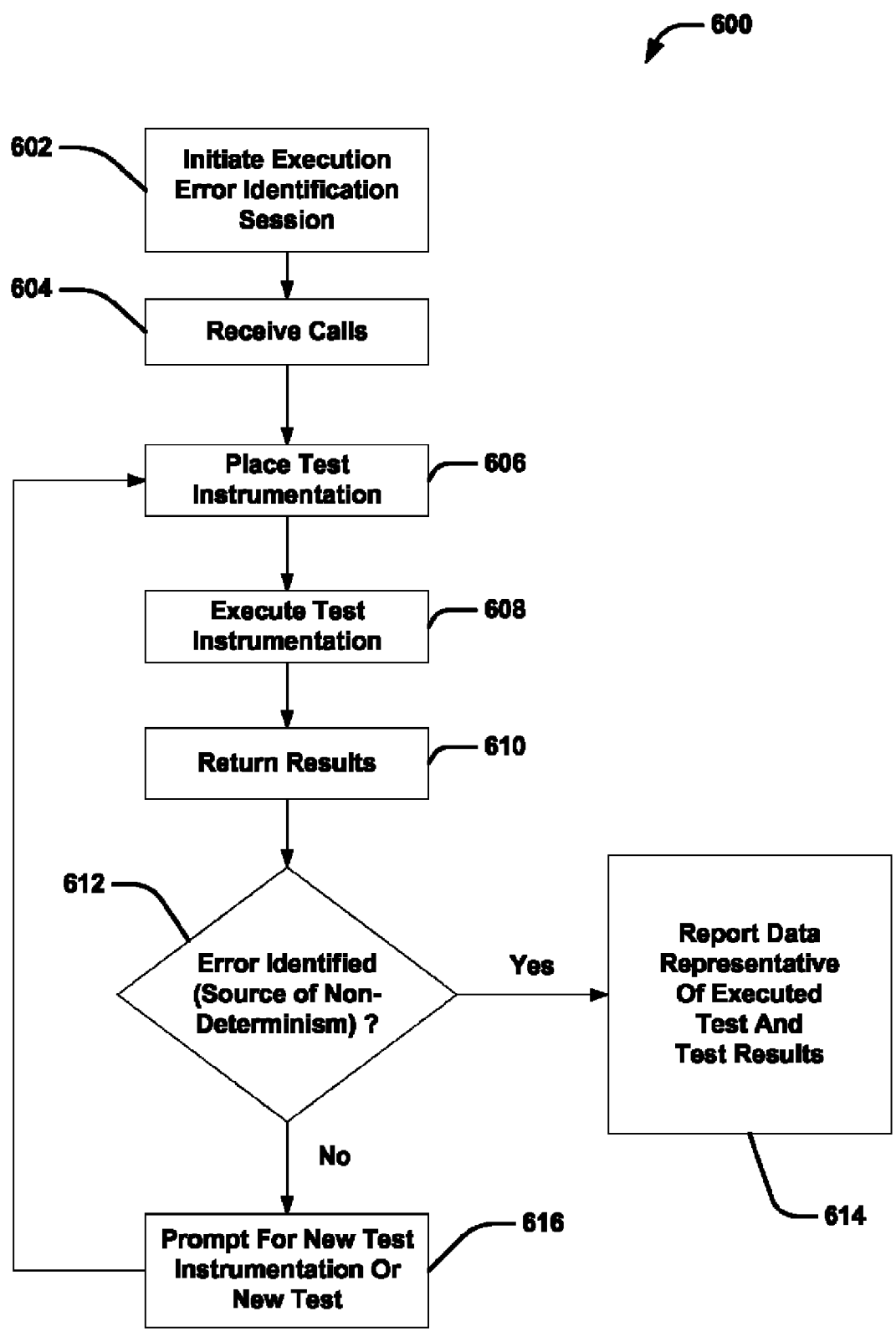
FIG. 6 is a flow diagram of an exemplary method performed for test amplification utilizing non-determinism and selected instrumentation in accordance with the herein described systems and methods.

FIG. 6 is a flow diagram of one example of a method 600 performed to run an execution error test according to a non-determinism source testing paradigm. Prior to starting the execution error test, instrumentation is placed along a selected test routine. As is shown in FIG. 5, processing begins at block 602 where an execution error identification session is initiated. Processing then proceeds to block 604 where one or more test routine calls are received. The test instrumentation is then executed at block 608 to observe return calls which are provided at block 619. A check is then performed at block 612 to determine if the error is identified. If the check at block 612 indicates that the error is identified, processing proceeds to block 614 where data representative of the executed test and test results for resolving error are reported.

However, if the check at block 612 indicates that the error is not identified, processing proceeds to block 616 where a new test is deployed. Processing then reverts back to block 606 and proceeds from there.

The methods can be implemented by computer-executable instructions stored on one or more computer-readable media or conveyed by a signal of any suitable type. The methods can be implemented at least in part manually. The steps of the methods can be implemented by software or combinations of software and hardware and in any of the ways described above. The computer-executable instructions can be the same process executing on a single or a plurality of microprocessors or multiple processes executing on a single or a plurality of microprocessors. The methods can be repeated any number of times as needed and the steps of the methods can be performed in any suitable order.

The subject matter described herein can operate in the general context of computer-executable instructions, such as program modules, executed by one or more components. Generally, program modules include routines, programs, objects, data structures, etc., that perform particular tasks or implement particular abstract data types. Typically, the functionality of the program modules can be combined or distributed as desired. Although the description above relates generally to computer-executable instructions of a computer program that runs on a computer and/or computers, the user interfaces, methods and systems also can be implemented in combination with other program modules. Generally, program modules include routines, programs, components, data structures, etc. that perform particular tasks and/or implement particular abstract data types.

Moreover, the subject matter described herein can be practiced with most any suitable computer system configurations, including single-processor or multiprocessor computer systems, mini-computing devices, mainframe computers, personal computers, stand-alone computers, hand-held computing devices, wearable computing devices, microprocessor-based or programmable consumer electronics, and the like as well as distributed computing environments in which tasks are performed by remote processing devices that are linked through a communications network. In a distributed computing environment, program modules can be located in both local and remote memory storage devices. The methods and systems described herein can be embodied on a computer-readable medium having computer-executable instructions as well as signals (e.g., electronic signals) manufactured to transmit such information, for instance, on a network.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing some of the claims.

It is, of course, not possible to describe every conceivable combination of components or methodologies that fall within the claimed subject matter, and many further combinations and permutations of the subject matter are possible. While a particular feature may have been disclosed with respect to only one of several implementations, such feature can be combined with one or more other features of the other implementations of the subject matter as may be desired and advantageous for any given or particular application.

Moreover, it is to be appreciated that various aspects as described herein can be implemented on portable computing devices (e.g., field medical device), and other aspects can be implemented across distributed computing platforms (e.g., remote medicine, or research applications). Likewise, various aspects as described herein can be implemented as a set of services (e.g., modeling, predicting, analytics, etc.).

Figure 7:
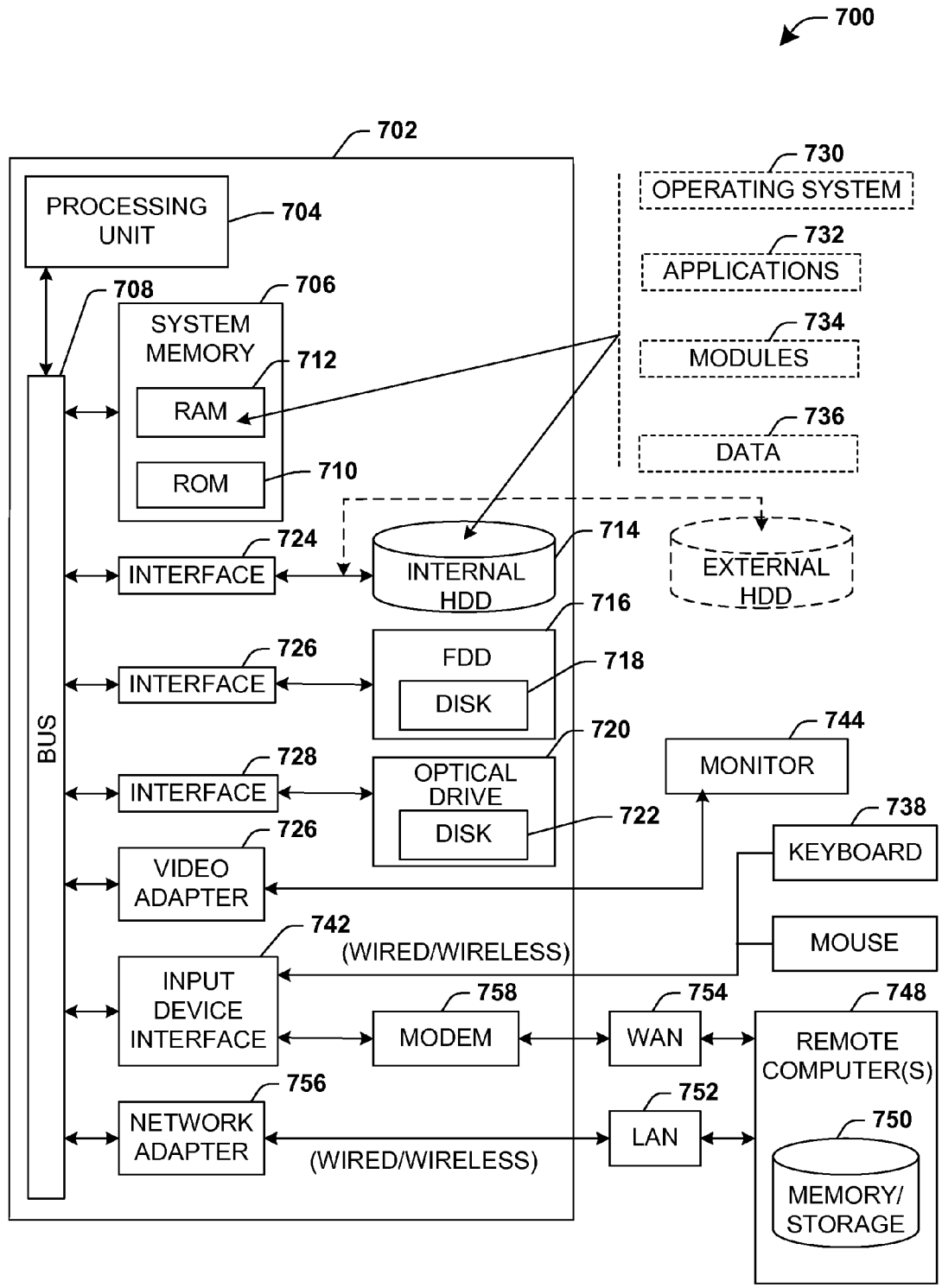
FIG. 7 is a block diagram of an exemplary computing environment.

FIG. 7 illustrates a block diagram of a computer operable to execute the disclosed architecture. In order to provide additional context for various aspects of the subject specification, FIG. 7 and the following discussion are intended to provide a brief, general description of a suitable computing environment 700 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

More particularly, and referring to FIG. 7, an example environment 700 for implementing various aspects as described in the specification includes a computer 702, the computer 702 including a processing unit 704, a system memory 706 and a system bus 708. The system bus 708 couples system components including, but not limited to, the system memory 706 to the processing unit 704. The processing unit 704 can be any of various commercially available processors. Dual microprocessors and other multi-processor architectures may also be employed as the processing unit 704.

The system bus 708 can be any of several types of bus structure that may further interconnect to a memory bus (with or without a memory controller), a peripheral bus, and a local bus using any of a variety of commercially available bus architectures. The system memory 706 includes read-only memory (ROM) 710 and random access memory (RAM) 712. A basic input/output system (BIOS) is stored in a nonvolatile memory 710 such as ROM, EPROM, EEPROM, which BIOS contains the basic routines that help to transfer information between elements within the computer 702, such as during start-up. The RAM 712 can also include a high-speed RAM such as static RAM for caching data.

The computer 702 further includes an internal hard disk drive (HDD) 714 (e.g., EIDE, SATA), which internal hard disk drive 714 may also be configured for external use in a suitable chassis (not shown), a magnetic floppy disk drive (FDD) 716, (e.g., to read from or write to a removable diskette 718) and an optical disk drive 720, (e.g., reading a CD-ROM disk 722 or, to read from or write to other high capacity optical media such as the DVD). The hard disk drive 714, magnetic disk drive 716 and optical disk drive 720 can be connected to the system bus 708 by a hard disk drive interface 724, a magnetic disk drive interface 726 and an optical drive interface 728, respectively. The interface 724 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 712, including an operating system 730, one or more application programs 732, other program modules 734 and program data 736. All or portions of the operating system, applications, modules, and/or data can also be cached in the RAM 712. It is appreciated that the specification can be implemented with various commercially available operating systems or combinations of operating systems.

A user can enter commands and information into the computer 702 through one or more wired/wireless input devices, e.g., a keyboard 738 and a pointing device, such as a mouse 740. Other input devices (not shown) may include a microphone, an IR remote control, a joystick, a game pad, a stylus pen, touch screen, or the like. These and other input devices are often connected to the processing unit 704 through an input device interface 742 that is coupled to the system bus 708, but can be connected by other interfaces, such as a parallel port, an IEEE 1394 serial port, a game port, a USB port, an IR interface, etc.

A monitor 744 or other type of display device is also connected to the system bus 708 via an interface, such as a video adapter 746. In addition to the monitor 744, a computer typically includes other peripheral output devices (not shown), such as speakers, printers, etc.

The computer 702 may operate in a networked environment using logical connections via wired and/or wireless communications to one or more remote computers, such as a remote computer(s) 748. The remote computer(s) 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wired/wireless connectivity to a local area network (LAN) 752 and/or larger networks, e.g., a wide area network (WAN) 754. Such LAN and WAN networking environments are commonplace in offices and companies, and facilitate enterprise-wide computer networks, such as intranets, all of which may connect to a global communications network, e.g., the Internet.

When used in a LAN networking environment, the computer 702 is connected to the local network 752 through a wired and/or wireless communication network interface or adapter 756. The adapter 756 may facilitate wired or wireless communication to the LAN 752, which may also include a wireless access point disposed thereon for communicating with the wireless adapter 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wired or wireless device, is connected to the system bus 708 via the serial port interface 742. In a networked environment, program modules depicted relative to the computer 702, or portions thereof, can be stored in the remote memory/storage device 750. It will be appreciated that the network connections shown are example and other means of establishing a communications link between the computers can be used.

The computer 702 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 8:
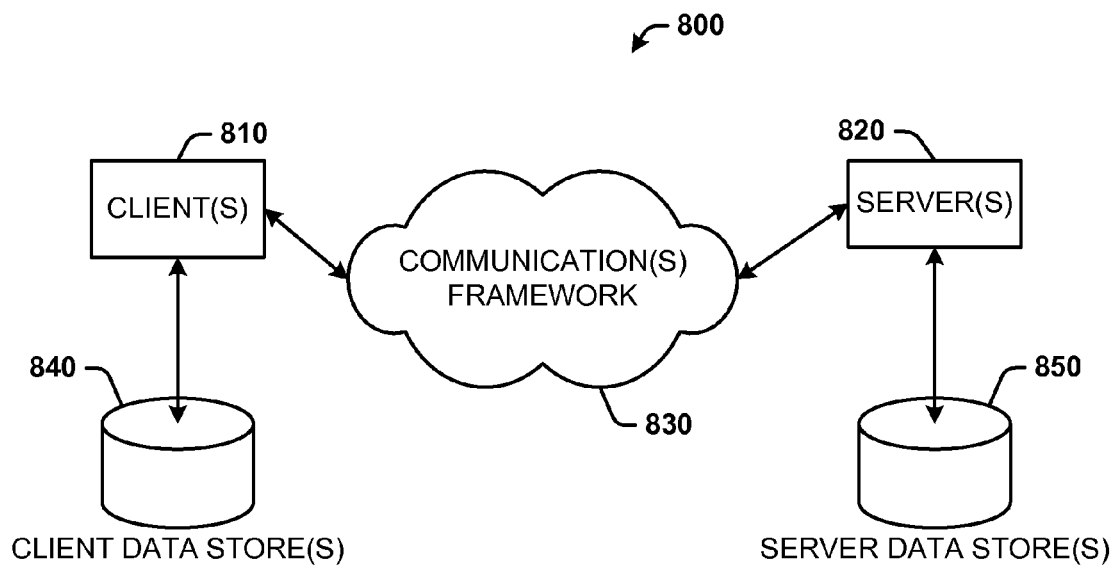
FIG. 8 is a block diagram of an exemplary networked computing environment.

Referring now to FIG. 8, there is illustrated a schematic block diagram of an exemplary computing environment 800 in accordance with the subject invention. The system 800 includes one or more client(s) 810. The client(s) 810 can be hardware and/or software (e.g., threads, processes, computing devices). The client(s) 810 can house cookie(s) and/or associated contextual information by employing the subject invention, for example. The system 800 also includes one or more server(s) 820. The server(s) 820 can also be hardware and/or software (e.g., threads, processes, computing devices). The servers 820 can house threads to perform transformations by employing the subject methods and/or systems for example. One possible communication between a client 810 and a server 820 can be in the form of a data packet adapted to be transmitted between two or more computer processes. The data packet may include a cookie and/or associated contextual information, for example. The system 800 includes a communication framework 830 (e.g., a global communication network such as the Internet) that can be employed to facilitate communications between the client(s) 810 and the server(s) 820.

Communications can be facilitated via a wired (including optical fiber) and/or wireless technology. The client(s) 810 are operatively connected to one or more client data store(s) 840 that can be employed to store information local to the client(s) 810 (e.g., cookie(s) and/or associated contextual information). Similarly, the server(s) 820 are operatively connected to one or more server data store(s) 850 that can be employed to store information local to the servers 820.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for executing error tests to identify execution errors in a computer system of a distributed computing environment, the system comprising:
   a processor;
   a test amplification engine configured to process data representative of a selected execution error test;
   an instruction set comprising at least one instruction configured to instruct the test amplification engine to re-run one or more execution error test routines at a user-defined source of non-determinism according to a plurality of different execution paths; and
   a computer-readable storage medium storing the instruction set and instructions that, when executed by the processor, cause the processor to implement the test amplification engine.

2. The system as recited in claim 1, wherein at least one of the one or more execution error test routines includes at least one selected definition associated with monitoring selected events.

3. The system as recited in claim 2, wherein an instrumentation for identifying additional sources of non-determinism is an instrumentation received from a user.

4. The system as recited in claim 3, wherein the test amplification engine is further configured to execute the one or more execution error test routines to identify execution errors.

5. The system as recited in claim 1, wherein the test amplification engine is further configured to execute the one or more execution error test routines according to a selected decision tree.

6. The system as recited in claim 5, wherein the selected decision tree is representative of one or more resultant sets for the one or more execution error test routines.

7. The system as recited in claim 5, wherein the test amplification engine is further configured to propagate through one or more branches of the selected decision tree to identify errors.

8. The system as recited in claim 7, wherein the test amplification engine is further configured to attempt another one of the one or more execution error test routines in an event that the test amplification engine reaching a logical conclusion of a decision tree branch.

9. The system as recited in claim 1, wherein the test amplification engine is further configured to execute test instrumentation points as part of executing the one or more execution error test routines.

10. The system as recited in claim 1, wherein the test amplification engine comprises a portion of a distributed computing application in a distributed computing environment.

11. A method to facilitate the identification of execution errors in a computer system of a distributed computing environment, the method comprising:
   executing on a processor, instructions that, when executed, perform operations comprising:
      receiving a call from one or more execution error test routines having definitions for instrumentation of the one or more execution error test routines, wherein the instrumentation is representative of user-defined sources of non-determinism of an operation of the distributed computing environment;
      executing the one or more execution error test routines in at least one of the user-defined sources of non-determinism according to a plurality of different execution paths to identify execution errors; and
      returning results of the executing the one or more execution error test routines.

12. The method as recited in claim 11, further comprising receiving data representative of one or more points of instrumentation associated with at least one of a test code or an application code.

13. The method as recited in claim 11, further comprising reporting data representative of at least one of an executed test or test results.

14. The method as recited in claim 11, wherein the executing the one or more execution error test routines comprises at least one of a full or partial instrumentation of the one or more execution error test routines,
   wherein the partial instrumentation comprises identifying a selected one or more sources of non-determinism associated with at least one of a test code or an application code.

15. The method as recited in claim 11, further comprising receiving data representative of another one of the one or more execution error test routines in an event that an execution of the one or more test routines does not identify errors.

16. The method as recited in claim 11, further comprising allowing one or more participating programmers to provide definitions for instrumentation for identifying additional user-defined sources of non-determinism associated with at least one of a test code or an application code having a probability of identifying execution errors.

17. The method as recited in claim 16, further comprising repeating an execution of the one or more execution error test routines to identify execution errors.

18. The method as recited in claim 16, wherein the executing the one or more execution error test routines includes executing the instrumentation of the one or more test routines according to a selected exploration mode.

19. The method as recited in claim 11, further comprising providing an application specific instrumentation representative of operations of a selected computing application operable on the distributed computing environment.

20. A computer-readable storage medium having computer-readable instructions that, when executed on a computing device, cause the computing device to perform operations comprising:
   receiving a call from one or more existing execution error test routines having definitions for instrumentation of the one or more execution error test routines, wherein the instrumentation is representative of user-defined sources of non-determinism of an operation of a distributed computing environment;
   executing the one or more execution error test routines in at least one of the user-defined sources of non-determinism according to a plurality of different execution paths to identify execution errors; and
   returning results of the executing.

* * * * *